US008344943B2

(12) United States Patent
Brown et al.

(10) Patent No.: US 8,344,943 B2
(45) Date of Patent: Jan. 1, 2013

(54) LOW-PROFILE OMNIDIRECTIONAL RETRODIRECTIVE ANTENNAS

(75) Inventors: Elliott R. Brown, Glendale, CA (US); Abraham Hartenstein, Chatsworth, CA (US)

(73) Assignee: Physical Domains, LLC, Glendale, CA (US)

( * ) Notice: Subject to any disclaimer, the term of this patent is extended or adjusted under 35 U.S.C. 154(b) by 540 days.

(21) Appl. No.: 12/511,065

(22) Filed: Jul. 28, 2009

(65) Prior Publication Data

US 2010/0066590 A1  Mar. 18, 2010

Related U.S. Application Data

(60) Provisional application No. 61/137,020, filed on Jul. 28, 2008.

(51) Int. Cl.
*G01S 13/00* (2006.01)
(52) U.S. Cl. ............... 342/147; 342/175; 342/370
(58) Field of Classification Search ............ 342/370
See application file for complete search history.

(56) References Cited

U.S. PATENT DOCUMENTS

| | | | | | |
|---|---|---|---|---|---|
| 3,196,438 | A | * | 7/1965 | Kompfner | 342/353 |
| 3,273,151 | A | * | 9/1966 | Cutler et al. | 342/353 |
| 3,422,436 | A | * | 1/1969 | Marston | 343/754 |
| 3,438,038 | A | * | 4/1969 | Marston | 343/754 |
| 3,680,112 | A | * | 7/1972 | Thomas | 342/370 |
| 3,715,749 | A | * | 2/1973 | Archer | 342/157 |
| 3,736,592 | A | * | 5/1973 | Coleman | 342/370 |
| 3,754,257 | A | * | 8/1973 | Coleman | 342/370 |
| 3,789,417 | A | * | 1/1974 | Coleman | 343/816 |
| 3,803,618 | A | * | 4/1974 | Coleman | 343/754 |
| 4,210,910 | A | * | 7/1980 | Wohlers | 342/60 |
| 4,612,543 | A | * | 9/1986 | DeVries | 342/187 |
| 4,980,692 | A | * | 12/1990 | Rudish et al. | 343/700 MS |
| 5,276,449 | A | * | 1/1994 | Walsh | 342/5 |
| 6,121,927 | A | * | 9/2000 | Kalliojarvi | 342/453 |
| 6,181,914 | B1 | * | 1/2001 | Marchand | 455/25 |
| 6,657,580 | B1 | * | 12/2003 | Edwards et al. | 342/51 |
| 6,870,517 | B1 | * | 3/2005 | Anderson | 343/909 |
| 7,944,396 | B2 | | 5/2011 | Brown et al. | 342/370 |
| 8,078,514 | B2 | | 12/2011 | Dias et al. | 705/35 |

OTHER PUBLICATIONS

DiDomenico et al. "Digital Communications Using Self-Phased Arrays". IEEE Transactions on Microwave Theory and Techniques. vol. 49. No. 4. Apr. 2001. pp. 677-684.*

Miyamoto et al. "Retrodirective Arrays for Wireless Communications". IEEE Microwave Magazine. Mar. 2002. pp. 71-79.*

\* cited by examiner

*Primary Examiner* — John B Sotomayor
*Assistant Examiner* — Matthew M Barker
(74) *Attorney, Agent, or Firm* — Dennis R. Smalley (57) ABSTRACT

Embodiments of the invention are directed to retrodirective radio-frequency systems wherein a transmit antenna array includes at least one row of N transmit elements and a receive antenna array includes at least one row of N receive elements that correspond one-to-one to the transmit elements and wherein the transmit and receive elements are located on spaced planes, and centered about a common axis and located at common transmit distance and a common receive distance, respectively. In some embodiments the one row of transmit and receive elements comprises "n" rows of elements, where "n" is an integer greater than one, thereby forming a two-dimensional array. In some embodiments the total transmit radiation pattern provides an azimuth coverage of 360 degrees. In other embodiments, it may provide less coverage but be operable as independent sectors. In some embodiments, the desired transmit wave form will be identical between all transmit elements of the array, one possible example being pseudo random noise imparted on a sinusoidal carrier.

10 Claims, 11 Drawing Sheets

By law of cosines:
$(r_n)^2 = R^2 + (R_0)^2 - 2RR_0\cos(\theta_n - \theta_t)$

LOW-PROFILE OMNIDIRECTIONAL RETRODIRECTIVE ANTENNAS

RELATED APPLICATIONS

This application claims benefit of U.S. Provisional Patent Application No. 61/137,020 filed Jul. 28, 2008

US GOVERNMENT RIGHTS

At least a portion of the inventions disclosed and potentially claimed herein were made with Government support under Contract Number W911NF-05-C-0106. The Government has certain rights. Not all inventions disclosed herein were developed or conceived with government funding and it is not intended that the government attain rights in such inventions.

FIELD OF THE INVENTION

The present invention relates generally to electromagnetic radiation transmission and reception methods and apparatus related to a retrodirective antenna configurations that allow up to 360 omnidirectional target detection capability in azimuth along with any desired level of elevational coverage.

BACKGROUND OF THE INVENTION

Retrodirective antennas have become of great interest for communications and radar to simplify the task of steering and focusing the beams from planar phased array antennas. In a recent radar development, pseudorandom transmit waveforms have been combined with a retrodirective antenna architecture to realize a system that can automatically point, track, and focus a beam while deriving range and angle information from the received and de-correlated signal. A problem with this approach is spatial diversity of the beam. Because all elements lie in a common plane, the maximum possible beam angle is just the beamwidth of a single element. In order to achieve this beamwidth in search mode, it is necessary that separate elements transmit quasi-orthogonal pseudorandom noise (PRN) sequences, meaning that an N-element array must minimally transmit N such sequences. This is straightforward on the transmit side, but cumbersome on the receive side because each receiver must now be able to cross-correlate against all N transmit sequences in order to process all the available radiated power. This requirement combined with separate digital Doppler filtering of each correlator output presents a huge challenge in digital signal processing from both a hardware and software standpoint.

SUMMARY OF THE INVENTION

It is an object of some embodiments of the invention to provide improved retrodirective radar systems.

It is an object of some embodiments to provide retrodirective radar systems that have 360 degrees of azimuthal coverage.

It is an object of some embodiments of the invention to provide retrodirective radar systems having antenna arrays in cylindrical configurations with a sufficient number of transmit and receive elements located about the circumference for an application-specific field-of-view, less than 360 degrees.

It is an object of some embodiments of the invention to provide retrodirective radar systems having non-cylindrical antennas, such as prismoidal configurations that cover 360 degrees or somewhat less in azimuth.

It is an object of some embodiments of the invention to provide improved retrodirective transmit and receive methods.

Other objectives and advantages of various embodiments and aspects of the invention will be apparent to those of skill in the art upon review of the teachings herein. The various embodiments or aspects of the invention, set forth explicitly herein, or otherwise ascertained from the teachings herein, may address one or more of the above objectives alone or in combination, or alternatively may address some other objective of the invention. It is not necessarily intended that all objectives be addressed by any single aspect of the invention, even though that may be the case with regard to some aspects.

A first aspect of the invention provides a retrodirective antenna including: (a) a transmit antenna array having at least one row of N transmit elements with each transmit element located in a first common plane at a common transmit radial distance from a center of the transmit antenna array, and each transmit element having a common spacing with its neighboring transmit elements over a defined angular transmit range, and each having a defined transmit azimuth position around the center of the transmit antenna array; (b) a receive antenna array having at least one row of N receive elements with each receive element located in a second common plane spaced from the first common plane, and each receive element having common receive radial distance from a center of the receive antenna array, wherein the center of the receive antenna is located along a line that extends through the center of the transmit antenna array and is perpendicular to the plane of the transmit antenna array, and wherein the each of the N transmit elements have a corresponding receive element, and wherein each of the corresponding transmit and receive elements have azimuth positions selected from the group consisting of (1) matching azimuth positions and (2) azimuth positions that are offset by a fixed amount which is less than the difference in azimuth positions between neighboring transmit elements; and (c) radio-frequency electronic components that join corresponding transmit and receive elements and drive each transmit element with a desired waveform such that retrodirectivity is provided between the received and transmitted radiation patterns.

Numerous variations of the first aspect of the invention are possible and include for example, one or more of: (1) the defined angular transmit coverage including (a) at least 90 degrees of azimuth, (b) at least 180 degrees of azimuth, (c) at least 270 degrees of azimuth, or (d) at least 360 degrees of azimuth; (2) the the transmit elements and receive elements being located on the surface of a cylinder; (3) the transmit elements and receive elements being located on the surface of a prism; (4) either the "N" transmit elements or the "N" receive elements have "endfire" radiation patterns and are located on a horizontal plane while the other of the "N" receive elements or "N" transmit elements have "broadside" radiation patterns and are located on a surface of a cylinder, wherein the cylinder has an axis that is perpendicular to the plane; (5) the transmit array comprises "n" rows of "N" elements, and the receive array includes "n" rows of "N" receive elements, wherein "n" is an integer greater than one and chosen from the group consisting of: (a) "n" being two, (b) "n" being three, and (c) "n" being four; (6) at least a portion of the "n" rows of "N" transmit elements and the "n" rows of "N" receive elements of the fifth variation of the first aspect are located on a conic section having rotational symmetry about the Z-axis such; (7) each element of the "n"×"N" array of transmit elements and each corresponding element of the "n"×"N" array of receive elements of the fifth variation of the first aspect of the invention define distinct channels wherein the phase of received signals can be used to determine angular target elevation and/or target azimuth; (8) the fifth variation of the first aspect of the invention wherein each of the "n" rows of transmit elements contain "N" transmit elements and wherein each of the "n" rows of receive elements contain "N" receive elements and wherein the N transmit elements in each of "n" rows of transmit elements are located at a common azimuth position, and the N receive elements on each of the "n" rows of receive elements are located at a common azimuth position; (9) the common transmit azimuth positions of the eight variation of the first aspect of the invention are chosen from a group consisting of:(a) the same as the common receive azimuth positions, and (b) shifted by a specific number of degrees relative to the common receive azimuth positions; (10) the corresponding transmit and receive elements being separated by an intervening electromagnetic absorber.

Numerous additional variations of the first aspect of the invention are possible and include for example, one or more of: (1) the desired waveform is transmitted at a desired nominal carrier frequency of between 2 GHz and 600 GHz; (2) wherein the desired waveform is transmitted at a desired nominal carrier frequency of between 6 GHz and 10 GHz; (3) corresponding transmit and receive elements are located above a ground plane and spaced from one another in the E plane of each antenna radiation pattern; (4) N is at least 32; (5) N is at least 64; (6) the common transmit radial distance is greater than five inches; (7) the common transmit radial distance is greater than ten inches; (8) corresponding transmit and receive elements are interconnected to each other by an electronic channel that generates complex feedback coefficients for the transmit elements by cross correlating the signal from each receive element; (9) the electronic channel interconnecting each corresponding receive element and transmit element of the eighth additional variation of the first aspect of the invention forms a feedback loop that, in the presence of a target, utilizes cross correlation and linearity to create a high degree of temporal correlation in the signal between the transmit elements such that a focusing and steering of the transmitted radiation occurs on and toward the target; (10) the transmit elements and the receive elements of the eighth additional variation of the first aspect of the invention are configured to provide phase conjugation such that the steering of the beam provides automatic pointing; (11) the desired waveform comprises pseudo random noise; (12) the pseudo random noise transmitted by each transmit element of the eleventh additional variation of the first aspect of the invention is quasi orthogonal to the pseudo random noise transmitted by other transmit elements; (13) the pseudo random noise transmitted by each transmit element of the eleventh additional variation of the first aspect of the invention is the same as that emitted by other transmit elements; (14) each element of a row is divided into two 2 or subelements with the subelement being spaced equally along the circumference of the antenna (e.g. an array of subelements may be made of 2, 3 or more subelements along the vertical direction.

A second aspect of the invention provides a method for detecting a target with a retrodirective antenna array within a defined transmit angle, comprising: (a) transmitting at least one of a plurality of desired waveforms from at least one row of N transmit elements, forming a transmit antenna array, with each transmit element located in a first common plane at a common transmit radial distance from a center of the transmit antenna array, and each transmit element having a common spacing with its neighboring transmit elements over a defined angular transmit range, and each having a defined transmit azimuth position around the center of the transmit antenna array; (b) receiving return signals from a target in at least one row of N receive elements, forming a receive antenna array, with each receive element located in second common plane spaced from the first common plane, and each receive element having common receive radial distance from a center of the receive antenna array, wherein the center of the receive antenna is located along a line that extends through the center of the transmit antenna array and is perpendicular to the plane of the transmit antenna array, and wherein the each of the N transmit elements have a corresponding receive element, and wherein each of the corresponding transmit and receive elements have azimuth positions selected from the group consisting of (1) matching azimuth positions and (2) azimuth positions that are offset by a fixed amount which is less than the difference in azimuth positions between successive transmit elements. (c) processing returned signals via RF electronic components that provide a feedback loop that utilizes correlative signal processing and linearity to create a re-transmitted signal such that a focusing and steering of the transmitted radiation occurs on and toward the at least one target, and such that azimuth, elevation and range information can be determined.

Numerous variations of the second aspect of the invention are possible and include for example, one or more of: (1) each transmit element of "n"×"N" array of transmit elements and each corresponding receive element of the "n"×"N" array of receive elements define distinct channels wherein the phase difference of received signals between channels can be used to determine angular target elevation and/or target azimuth; (2) each of the "n" rows of transmit elements contain "N" transmit elements and wherein each of the "n" rows of receive elements contain "N" receive elements and wherein the "N" transmit elements in each of "n" rows of transmit elements are located at the common transmit azimuth positions and wherein the "N" receive elements on each of the "n" rows of receive elements are located at common receive azimuth positions; (3) the common transmit azimuth positions of the second variation of the second aspect of the invention are chosen from a group consisting of: (a) the same as the common receive azimuth positions, and (b) shifted by a fixed number of degrees relative to the common receive azimuth positions; (4) corresponding transmit and receive elements are interconnected to each other by an electronic channel that generates complex feedback coefficients for the transmit elements by cross correlating the signal from each receive element against a table of all the transmitted waveforms; (5) the electronics between the corresponding receive and transmit elements is designed to created a transmit waveform that is proportional to the complex conjugate of the received signal, and thus automatically steers the transmit beam toward the target and also provide automatic pointing; (6) the desired plurality of waveforms comprises a set of pseudorandom noise sequences imparted on a sinusoidal radio-frequency carrier; (7) the pseudorandom noise waveform transmitted by each transmit element of the sixth variation of the second aspect of the invention is quasi-orthogonal with respect to the pseudorandom noise waveform transmitted by other transmit elements; (8) the pseudorandom noise waveform radiated by each transmit element of the sixth variation of the second aspect of the invention is the same as that emitted by all other transmit elements.

Numerous additional variations of the second aspect of the invention are possible and include for example, one or more of: (1) the desired waveform is transmitted at a desired nominal carrier frequency of between 2 GHz and 600 GHz; (2) the desired waveform is transmitted at a desired nominal carrier frequency of between 2 GHz and 100 GHz; (3) the desired waveform is transmitted at a desired nominal carrier frequency of between 6 GHz and 10 GHz; (4) corresponding transmit and receive elements are spaced from one another along an E-plane; (5) N is at least 32; (6) N is at least 64; (7) the common transmit radial distance is greater than five inches; (8) the common transmit radial distance is greater than ten inches; (9) the defined angular transmit range is selected from the group consisting of (a) at least 90 degrees of azimuth, (b) at least 180 degrees of azimuth, (c) at least 270 degrees of azimuth, and (d) at least 360 degrees of azimuth; (9) the transmit elements and receive elements are located on a surface of a cylinder; (10) either the "N" transmit elements or the "N" receive elements are located on an up-facing plane while the other of the "N" receive elements or "N" transmit elements are located on a surface of a cylinder, wherein the cylinder has an axis that is perpendicular to the plane; (11) the transmit array comprises at least "n" rows of "N" transmit elements and the receive array at Feast "n" rows of "N" receive elements, wherein "n" is an integer greater than one; (12) "n" is two or three in the eleventh additional variation of the second aspect of the invention.

Numerous variations of the first aspect of the invention are possible and include for example, one or more of: (1) making each transmit element and its corresponding receive element physically one and the same, and distinguishing the transmit and receive signals by other means, such as a passive circulator; (2) locating separate transmit and receive arrays on a non-cylindrical surface, such as a prism; (3) locating the transmit and receive arrays on a conical section having cylindrical symmetry, and (4) locating the transmit and receive arrays on a pyramidal surface, In all cases, retrodirective feedback is maintained by satisfying the equal physical-separation and phase conjugation conditions stated in [14].

Further aspects of the invention will be understood by those of skill in the art upon review of the teachings herein. These other aspects of the invention may involve methods that can be used in combination with the apparatus aspects of the invention as set forth above or in combination with other apparatus. Further aspects of the invention may provide various combinations of the aspects, embodiments, and associated alternatives set forth herein, alone or combination with the materials incorporated herein by reference, as well as provide other configurations, structures, functional relationships, and processes that have not been specifically set forth above.

DETAILED DESCRIPTION OF PREFERRED EMBODIMENTS

Embodiments of the present invention provide radar antenna configurations capable of providing arbitrarily broad transmit angle (up to 360 degrees of azimuth) in search mode and retrodirective radiation feedback. Certain embodiments are well suited to pseudo-random noise waveforms, while in other embodiments, different waveforms can be used. In some embodiments, antenna elements are located on the surface of a cylindrical substrate as shown in FIG. 1.

Figure 1:
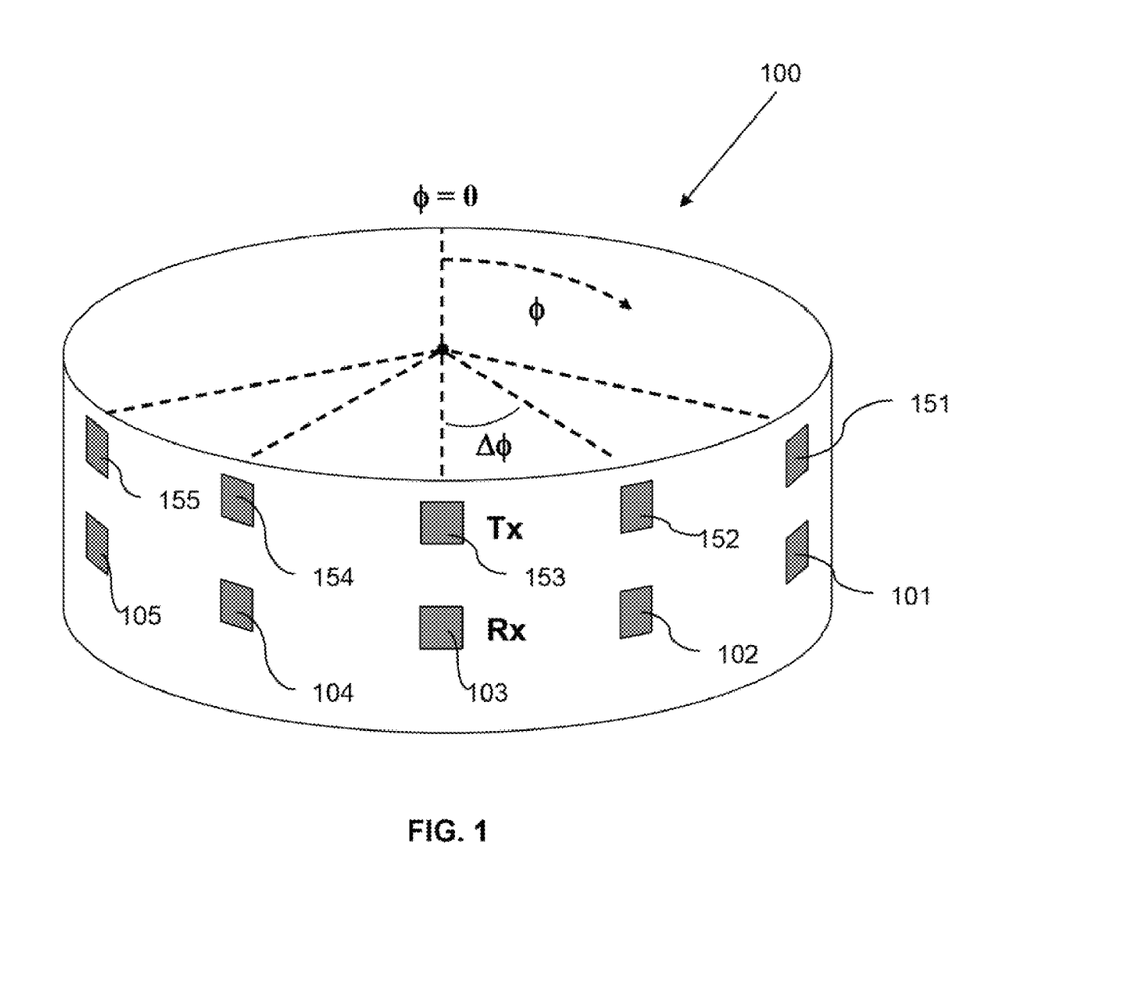
FIG. 1 provides a schematic illustration of transmit and receive elements of a first radar embodiment of the invention wherein the transmit and receive elements are located in separated rows with a one-to-one correspondence between transmit and receive elements wherein the plurality of transmit elements and receive elements are located with a uniform spacing around the cylindrical surface.

FIG. 1 provides a schematic illustration of an antenna 100 having transmit elements 151-155 and receive elements 101-105 of a first radar embodiment of the invention wherein the transmit and receive elements are located in separate rows (i.e. in separate circular planes spaced from one another along a Z axis corresponding to the axis of the cylinder) with a one-to-one correspondence between transmit and receive elements 101-151, 102-152, ..., and 105-155, and wherein the plurality of transmit elements and receive elements are located with a uniform spacing around the cylindrical surface as measured about the circumference or as measured by angular displacement relative to the center of the array ($\Delta\phi$). The antenna pattern from the entire array will be retrodirective if each transmit antenna radiates a waveform proportional to the complex conjugate of the signal coming in to the corresponding receive element.

In other alternative embodiments the antenna elements may be located on tapered circular surfaces (e.g. conical sections) or even spherical surface sections. In some preferred embodiments, the transmit and receive elements for each channel are located at the same azimuth position $\phi_n$, as shown in FIG. 1 and separated by enough physical distance $\Delta z$ to allow for sufficient transmit-receive radiative isolation. In some alternative embodiments, the transmit elements may a have spacing matching that of the receive elements but the receive elements may be somewhat shifted along in azimuth relative to the transmit elements while still maintaining a one-to-one correspondence. By judicious choice of the element antenna pattern and element-to-element azimuthal separation ($\Delta\phi$), a broad and quasi-isotropic beam can be obtained from the entire array in search mode, and this beam can be pointed and focused automatically by retrodirective feedback.

A straightforward means of manufacturing a cylindrical antenna, such as that shown in FIG. 1, is a "wrap-around" antenna using a flexible dielectric substrate such as a plastic or plastic-ceramic composite. By "wrap-around", we mean an antenna that is processed flat and later cold-rolled to the desired radius of curvature. Wraparound antennas were developed originally for airborne applications where low profile was required to overcome drag, friction, and aerodynamic characteristics. Wraparound antennas are not limited in size or electrical performance like other antennas, and also scale well with operating frequency.

In a first group of embodiments, the transmit and receive elements are advantageously located at the same azimuth angles which allows retrodirectivity to be achieved by radiating a waveform from each transmit element that is the complex-conjugate of the signal from the corresponding receive element. As discussed hereafter, this advantage applies equally well to "broadside-radiating" antenna elements configured in a circular array on the surface of a cylinder as well as to "endfire-radiating" elements in a circular array on a planar substrate. The circular transmit geometry inherently provides for spatial diversity of the beam in search mode and as such different waveforms (e.g., different PRN sequences) from each transmit channel are no longer needed to "scramble" the beam in search mode, although they can still be used in some alternative embodiments. Hence the cylindrical geometry makes it possible to achieve 360-degree coverage while radiating the same PRN sequence from each transmit element, which greatly simplifies the signal processing with little or no impact on the analog RF front-end.

Figure 2:
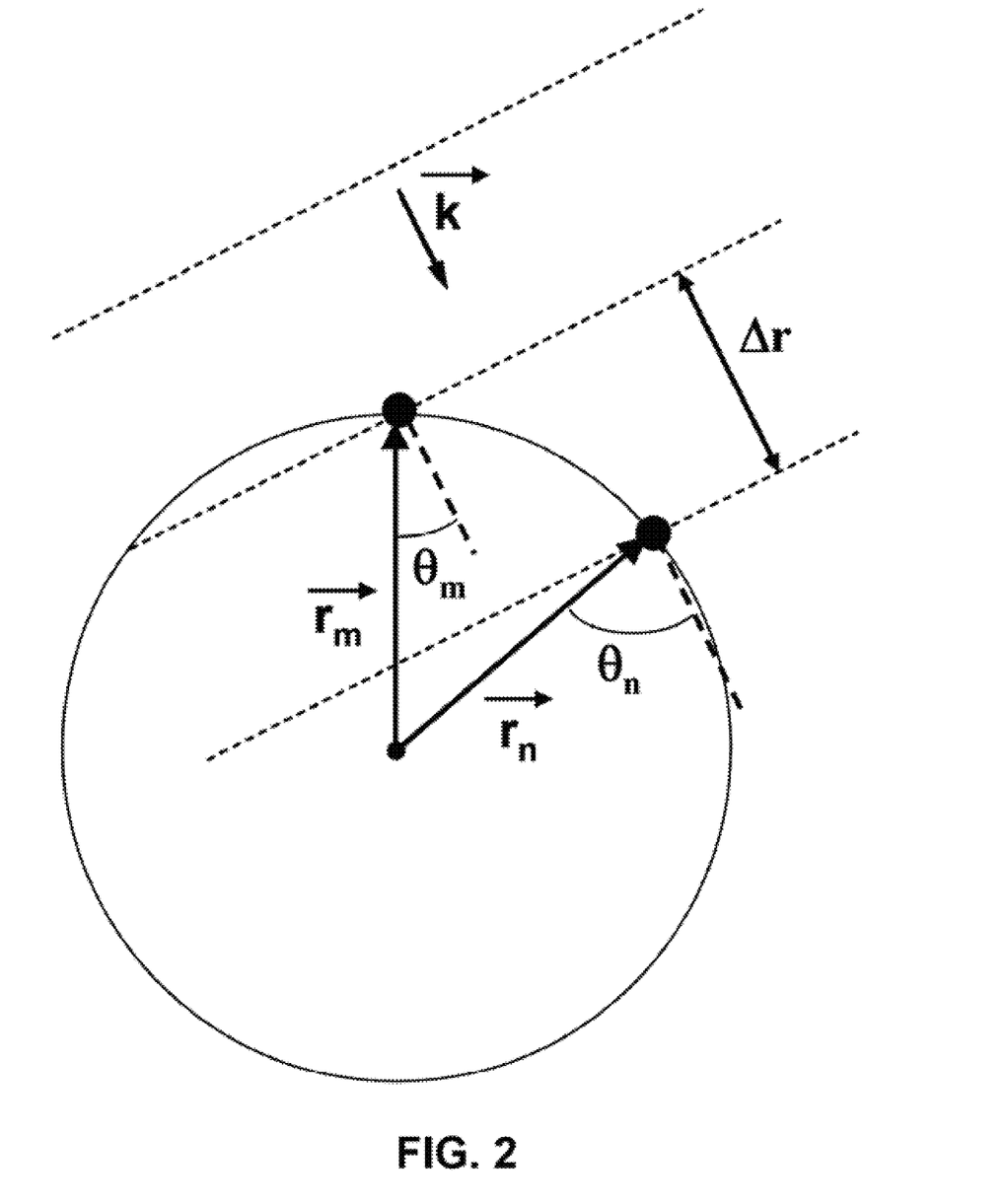
FIG. 2 provides a schematic illustration of the geometry looking down on a cylindrical array from the top at two elements with absolute separation Δr. A plane wave is incident on the array after reflection from a distant target, and is propagating with wave vector k.

By way of illustration and without limiting the invention to any particular theory or model of operation, the circular antenna geometry can be understood to satisfy the retrodirective condition by the following general argument based on the geometry of FIG. 2. A circular coordinate system can be defined with the origin at the geometric center and the analysis focuses on two arbitrarily chosen elements of the circular array, located at $\vec{r}_m$ and $\vec{r}_n$, respectively. It is assumed that the radiation is incident from a target located sufficiently far away from the antenna that it can be considered as located in the "far field". In this case, the incident radiation can be approximated as a plane wave, having the parallel phase fronts shown in FIG. 2. Associated with these wavefronts is a propagation wave vector $\vec{k}$. From fundamental electromagnetics, it is known that the electric field incident on the two elements will then be $$\tilde{E}_{i,m} = E_{i,m} \exp[j(\vec{k} \cdot \vec{r}_m + \omega t)] \text{ and } \tilde{E}_{i,n} = E_{i,n} \exp[j(\vec{k} \cdot \vec{r}_n + \omega t)] \quad (1)$$

where $\omega$ is the sinusoidal circular carrier frequency and t is the time If the circular array is smaller in diameter than the distance to the target, we expect $E_m \cong E_n$ independent of m and n. So assuming the target does not move appreciably over a time scale of the period $2\pi/\omega$, the two terms $\vec{k} \cdot \vec{r}_m$ and $\vec{k} \cdot \vec{r}_n$ represent constant phase factors that we call $\beta_m$ and $\beta_n$. Hence, we can write $$\beta_n = \beta_m + \Delta\beta \quad (2)$$

where $\Delta\beta = k\Delta r$ as shown in FIG. 2 and $\Delta r$ is the difference in physical distance between the two elements in the direction of $\vec{k}$. Of course, the actual received signal must be weighted by the square-root of the effective aperture, $A(\theta) = (\lambda^2/4\pi)G(\theta_i)$, where G is the angularly-dependent antenna gain and $\theta_i$ is the incident angle with respect to each element. This allows us to transform (1) into the received signals X $$\tilde{X}_{r,m} = A_m \sqrt{(\lambda^2/4\pi)G(\theta_{i,m})} \cdot \exp[j(\beta_m + \omega t)] \text{ and}$$

$$\tilde{X}_{r,n} = A_n \sqrt{(\lambda^2/4\pi)G(\theta_{i,n})} \cdot \exp[j(\beta_m + \Delta\beta + \omega t)] \quad (3)$$

where A is a constant that depends on the specific antenna type. If all the antenna elements are identical, then $A_m = A_n$ and $G(\theta_{i,m})$ and $G(\theta_{i,n})$ differ only by a real factor so we can write $$\tilde{X}_{r,m} = B_m \cdot \exp[j(\beta_m + \omega t)] \text{ and } \tilde{X}_{r,n} = B_n \cdot \exp[j(\beta_m + \Delta\beta + \omega t)] \quad (4)$$

The received signal in each channel is then assumed to be processed linearly and re-transmitted through the corresponding element lying just above or below it, so having the same same $G(\theta)$. Hence, the re-transmitted electric field has the form $$\tilde{E}_{t,m} = C_m \sqrt{G(\theta)} \exp[j(\gamma_m + \omega t)] \text{ and } \tilde{E}_{t,n} = C_n \sqrt{G(\theta)} \exp[j(\gamma_n + \omega t)] \quad (5)$$

where $C_m$ and $C_n$ are real constants and $\gamma$ is a phase factor to be determined From electromagnetics we know that retrodirectivity is obtained in plane waves simply by reversing the sign of k while keeping the same evolution of time. In other words, the re-transmitted waves from the two elements will be retrodirective with respect to the incident waves of (1) if and only if $$\tilde{E}_{t,m} = E_{t,m} \exp[j(-\vec{k} \cdot \vec{r}_m + \omega t)] \text{ and } \tilde{E}_{t,n} = E_{t,n} \exp[j(-\vec{k} \cdot \vec{r}_n + \omega t)] \quad (6)$$

Cross inspection of (5) and (6) utilizing (2) then leads to the sufficient condition that $$\gamma_m = -\beta_m \text{ and } \gamma_n = -\beta_n = -(\beta_m + \Delta\beta) \quad (7)$$

This is just the condition of phase conjugation. In other words, mutual retrodirectivity will be achieved for these two elements if the re-transmitted signal from each transmit element is proportional to the complex conjugate of the spatially-dependent incident signal on the corresponding receive element. Because our two receive elements were chosen arbitrarily, the argument applies to all transmit-receive pairs (i.e., "channels") of the array, provided that the transmit and receive elements are located at the same azimuthal angle.

A generalization of this proof can be made for antenna arrays in which the corresponding transmit and receive elements are not co-located in azimuth. The only requirement on antenna element geometry is that the each transmit-receive pair be separated by the same physical distance and have the same angular separation in whichever coordinate system the elements are defined. So for example, a shift of azimuth in FIG. 1 of the transmit array relative to the receive array would still provide for retrodirective feedback if the complex-conjugate signal processing is followed.

With retrodirective feedback satisfied, the preferred mode of operation for the circular array is to transmit the same waveform (e.g., a PRN sequence encoded on a sinusoidal carrier) from each element of the entire array since this greatly simplifies the system hardware and software requirements without sacrificing the inherent benefits of correlative signal processing. An issue in choosing just one waveform is the number of elements in the circular array, and the resulting array antenna pattern in search mode. If the elements are physically separated by a distance greater than one wavelength, we expect to observe distinct maxima and minima in the total radiation pattern caused by constructive and destructive interference of the radiation from neighboring elements. If they are separated by a distance less than one wavelength, the total pattern should be much smoother. Given the carrier frequency and array diameter, this intuitive rule will dictate how many elements are required to achieve a smooth total antenna pattern.

Figure 3:
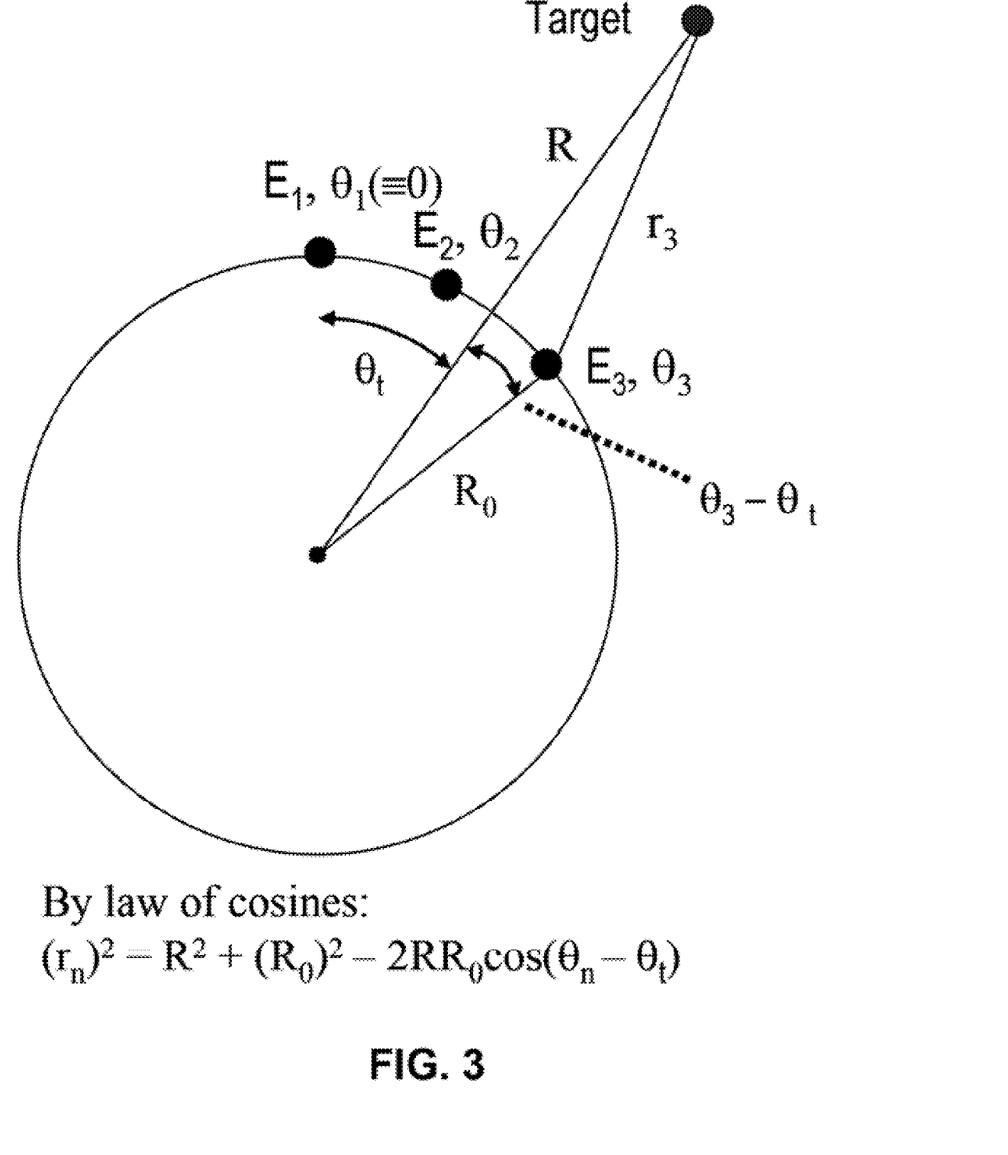
FIG. 3 provides a schematic illustration of the trigonometry looking down on a cylindrical array from the top at three adjacent elements located at angle $\theta_n$, and radius $R_0$ relative to the center, and at a target located at angle $\theta_I$ and range R relative to the center. These quantities are related by the law of cosines.

A simulation model has already been constructed to predict the array pattern in search mode based on the geometry in FIG. 3. The model assumes each element can be represented by the Gaussian beam pattern, $I(\theta)=G_0 \exp[-(\theta/\theta_0)^2]$ from $\theta=-90$ to $+90$, and $I(\theta)=0$ for $\theta=-90$ to $-180$ or $+90$ to $+180$. In this expression, $G_0$ is the boresight gain, and $\theta_0$ is the beamwidth parameter. The model places N elements on a circle of diameter D at fixed locations $\theta_n$, separated in angle by 360/N degrees. The far-field pattern at an arbitrary angle $\theta$ is computed by linearly superposing the electric field from all elements. Three different element configurations are considered: 16, 32, and 64 elements located with equal separation on a 21-inch-diameter circle. For the sake of analysis, the transmit carrier frequency is assumed to be 8.15 GHz, corresponding to a free-space wavelength of 1.44 inch. Table I lists the inter-element separation between nearest neighbors in the array, in terms of azimuthal angle, circumferential physical separation ($\Delta x = R_0 \cdot \Delta\theta$) and relative physical separation (normalized to the transmit carrier wavelength). We note that other frequencies could be assumed, as could other array diameters. The values assumed are typical for certain applications of the invention, such as retrodirective noise-correlating radar.

TABLE I

Separation between nearest neighbor elements in a notional wrap-around antenna having a 21-inch diameter and driven with an 8.15-GHz carrier.

| Number of elements | 16 | 32 | 64 |
|---|---|---|---|
| Angular separation [rad] | 0.39 | 0.20 | 0.10 |
| Physical separation [cm] | 10.47 | 5.24 | 2.62 |
| Relative separation [/lambda] | 2.85 | 1.42 | 0.71 |

Figure 4A:
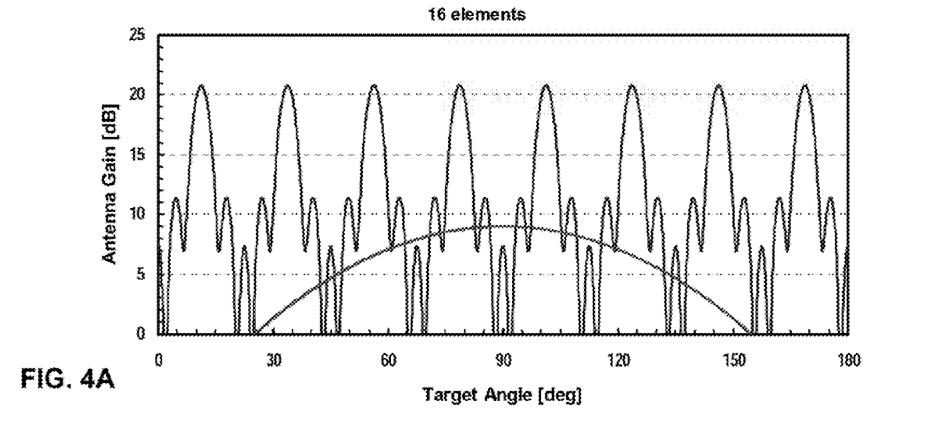
FIG. 4A-4C illustrate the total array gain associated with different azimuthal angles for three exemplary cylindrical antenna arrays having 16, 32, and 64 antenna elements, respectively, all lying at the same elevation around the cylinder. The transmit carrier frequency is assumed to be 8.15 GHz and the waveform is identical and synchronous for all elements. The cylinder diameter is assumed to be 21 inches. The individual elements are assumed to have a broadside directivity of 9.0 dB, and a pattern-width in the horizontal and vertical planes of 75° and 45°, respectively. The total array gain changes with azimuth ("scalloping") because of varying degrees of constructive and destructive interference between neighboring elements.
Figure 4B:
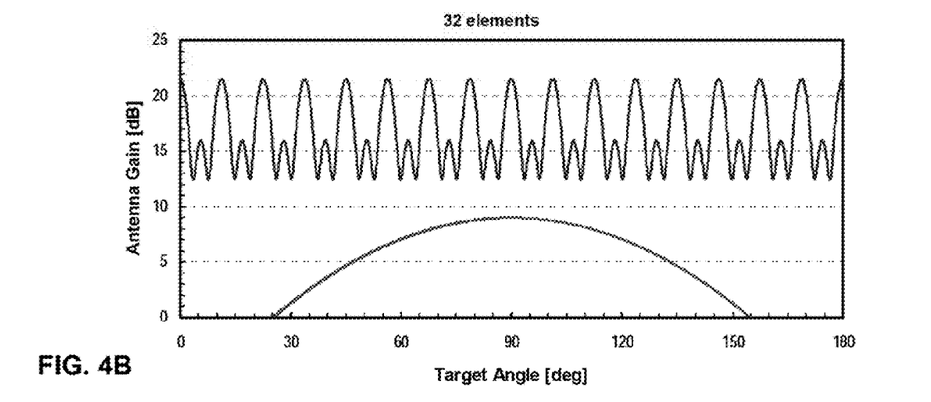
Figure 4C:
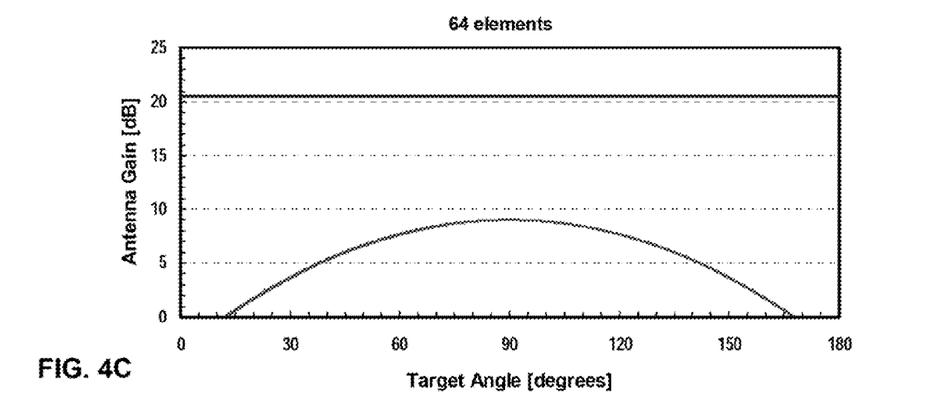

FIG. 4 shows the array gain vs azimuthal angle between 0 and 180 degrees (by symmetry, the array gain would have exactly the same form if plotted between 180 and 360 degrees). The array gain is a measure of the electromagnetic intensity (watts per unit area) a point target would be illuminated with if it were located in the "far field" and rotated around the circular array. Also plotted is the single-element gain function assuming a fullwidth at half-maximum (FWHM) of 75° in the horizontal plane ($\theta_0=45°$), and a boresight gain of 9.0 dB. FIGS. 4A-4C, respectively assume 16, 32, and 64 identical elements located in an equiangular fashion around the circle, whose diameter is assumed to be 21 inches.

FIGS. 4A-4C illustrate the dramatic difference in the gain function (vs angle) for the different element numbers. For the given conditions and 16 transmit elements, which are separated by 22.5 degrees, the plot of FIG. 4A shows gain varies between 0 and 21 dB. This is clearly way too much variation for the radar to operate in search mode since the angles of zero or near-zero gain would represent "blind spots" to radar sensitivity. For 32 elements which are separated by 11.25 degrees. FIG. 4B, shows that gain variation is much less—approximately 9 dB—from 12.5 to 21.5 dB, but which is still too "scalloped" for useful operation in search-mode.

However, for 64 elements which are separated by 5.625 degrees, FIG. 4C shows that the gain displays insignificant variation versus angle with a maximum just under 21 dB. Note that this is specific to the 21-inch diameter array having a carrier frequency of 8.15 GHz and elements with 75-degree (FWHM) in-plane beamwidth. Inspection of Table I suggests that the dividing line between omnidirectional behavior and "scalloped" behavior occurs when the inter-element physical separation changes from $<\lambda$ to $>\lambda$. This interpretation suggests that a reduction in the diameter or increase in the in-plane beamwidth would reduce the number of elements required. This is addressed in Table II, where it is seen that a reduction in diameter to 12 inches at the same carrier frequency (8.15 GHz) would reduce the number of elements to 26.

TABLE II

Minimal Number of Elements in Cylindrical Array Required to Obtain a Uniform Antenna Pattern in Search Mode

| Frequency [GHz] | 8.15 | 8.15 | 8.15 | 8.15 |
|---|---|---|---|---|
| Wavelength [inch] | 1.45 | 1.45 | 1.45 | 1.45 |
| Array diameter [in] | 21 | 18 | 15 | 12 |
| Circumference [in] | 66.0 | 56.5 | 47.1 | 37.7 |
| Number of Elements | 46 | 39 | 33 | 26 |

The small degree of "scalloping" in FIG. 4C with the 64-element cylindrical array also demonstrates the possibility of achieving a smooth-enough total antenna pattern for a radar to operate in "search mode" and not miss any incoming targets over a 360-degree field-of-view. Once the target is detected and retrodirective feedback is established (by phase conjugation), the total antenna pattern will change significantly, focusing on the target as it approaches In the embodiment of FIG. 1, the radar makes use of two wraparound antennas, one for transmit and one for receive. Depending on details of the configuration (i.e., nominal transmission carrier wavelength, array diameter, and the like), it is anticipated that each of the two arrays can function with acceptably low "scalloping" given a number N of elements around the circle. But if elevational information is desired, at least the receive array, must be extended to include one or more additional rows of elements (e.g. "n" rows of N elements each, where "n" is an integer greater than one), thereby making the array two-dimensional (2D). This is displayed for a 2×N transmit array and a 2×N receive array in FIG. 5. Each of the elements in the transmit array, whether 1D or 2D, can be fed the by the same waveform. And in the case of identical n×N transmit and receive arrays, retrodirectivity can be obtained by complex-conjugate signal processing between each receive element and its corresponding transmit element.

Figure 5:
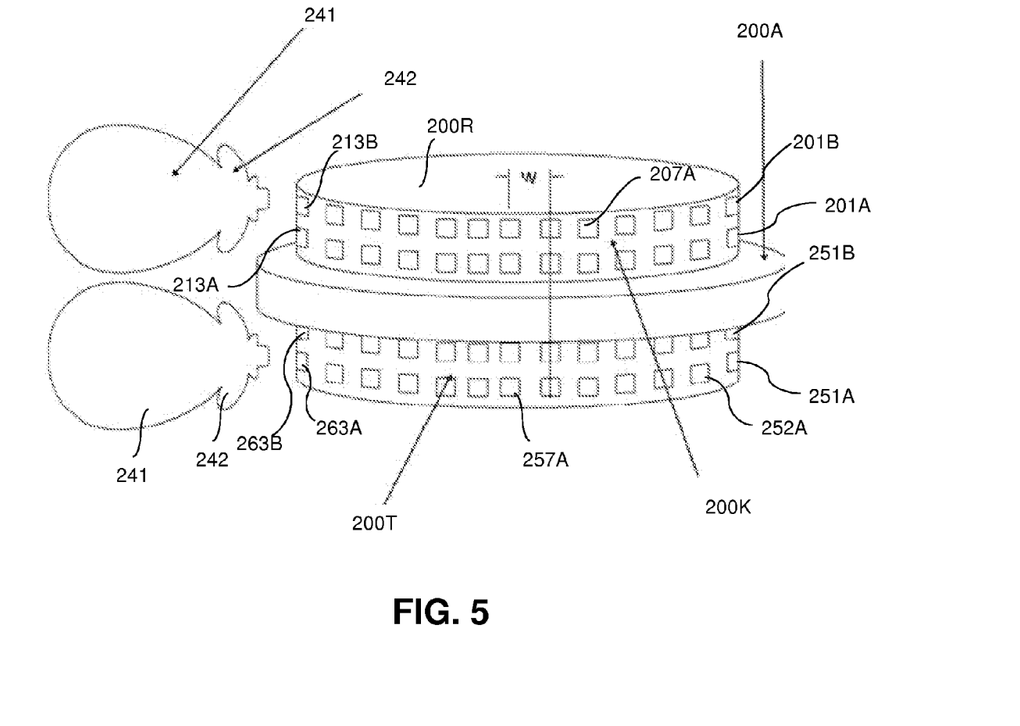
FIG. 5 provides an exemplary antenna array according to a second embodiment of the invention wherein the transmit array is located below the receive array (or vice versa) and an absorber ring is placed between them to reduce the electromagnetic coupling and improve the isolation. Each array includes two rows, with each row providing a plurality of elements. One transmit element is connected electronically to one receive element, forming conjugate pairs. Through coherent signal processing in the receiver, each receiver element will provide unique phase information. When used in a radar application, the difference in phase between horizontal elements in the receiver provides azimuthal information on the target, and the difference between vertical pairs provides elevational information.

Antennas can be provided such that each element of a row becomes a sub-array of 2 or more elements with the sub-arrays spaced equally along the circumference of the antenna (e.g. a sub-array may be made of 2, 3, or more elements along the vertical direction such as that shown in FIG. 5).

In order to minimize the total array size, the transmit and receive elements should be located as close as possible. Unfortunately, a limitation on locating the neighboring elements in close proximity is imposed by radiative coupling between a transmit element and the corresponding receive element. Depending on the system design and the associated electronics, a minimal isolation must exist to prevent the coupling from degrading the performance of the system. To achieve a satisfactory degree of isolation, some embodiments of the cylindrical array may incorporate additional features.

First, an absorbing ring or other shape of radiation-absorbing material may be placed between the two antenna arrays as shown in FIG. 5, which typically will display total antenna patterns having a main beam (241) and sidelobes (242) as shown qualitatively. The absorber can help to attenuate the sidelobes without affecting the main-beam FWHM. Therefore, the absorbing ring can reduce the radiative coupling between transmit and receive elements without significantly affecting the overall antenna pattern or the retrodirective feedback process.

The exemplary array of FIG. 5, the second embodiment of the invention, shows an absorbing ring 200A between the 2×N transmit array 200T and the 2×N receive array 200R (i.e. the receive array contains a first row having elements 201A-213A and a second row containing elements 201B-213B, while the transmit array contains a first row including elements 251A-263A and a second row containing elements 251B to 262B). Each corresponding receive/transmit pair comes with an independent electronic channel that through coherent signal processing can be used to measure the phase of the incident signal. In combination with phase-differencing between adjacent channels, this provides target azimuth and elevation information, but without the deleterious effect of strong mutual coupling between the transmit element and receive element.

In some embodiments, the absorber may be graded in refractive index and/or wave impedance to provide better absorption of the radiation without front- or back-surface reflection. The absorber can also be physically shaped to accomplish the same thing. This is helpful because many absorbing materials are made from graphite-impregnated foam or magnetic-powder-loaded silicone rubber, both of which can have significant front- or back-surface reflection.

Figure 6:
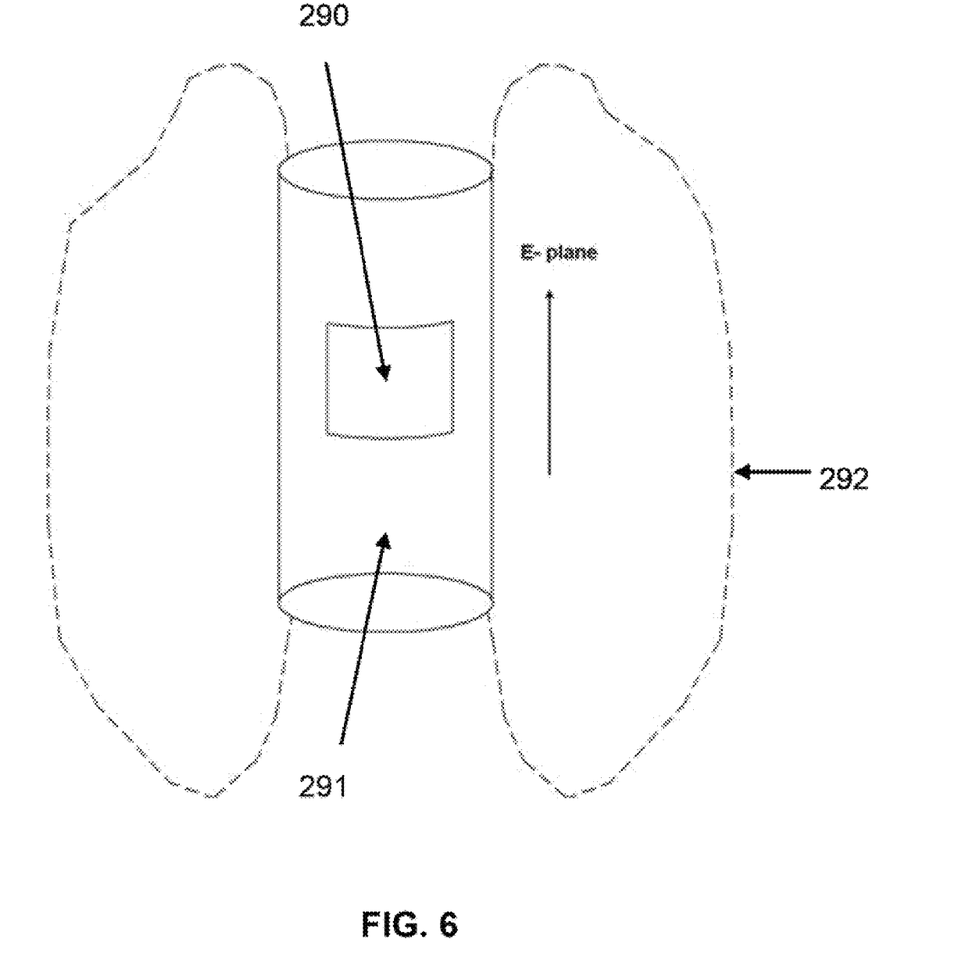
FIG. 6 illustrates a common feature of all embodiments of the present invention, which is an antenna element lying over a metallic ground plane. A good example of this is a patch antenna. With the metallic ground plane present, the antenna pattern shown as the dashed line in FIG. 6 approaches zero 90-degrees away in elevation from the broadside direction. This helps reduce the electromagnetic coupling between the transmit and receiver arrays in FIG. 5, and in other embodiments of the present invention.

A second means of reducing the coupling between transmit and receive elements is displayed schematically in FIG. 6. The sidelobes from each element along the vertical direction (E plane) may be reduced significantly, e.g. by 20 dB or more, by using an antenna element such as patch (290) over a metallic ground plane (291). If the antenna elements lie in a cylindrical configuration, the ground plane then has the form of a concentric inner tube (291). The resulting element pattern (292) tends to have a null along the E-plane (i.e., the plane that contains the radiated electric field and the propagation vector) as shown in FIG. 5. Therefore, if neighboring elements lie in this plane, they will have relatively low coupling of the free-space radiation.

Figure 7:
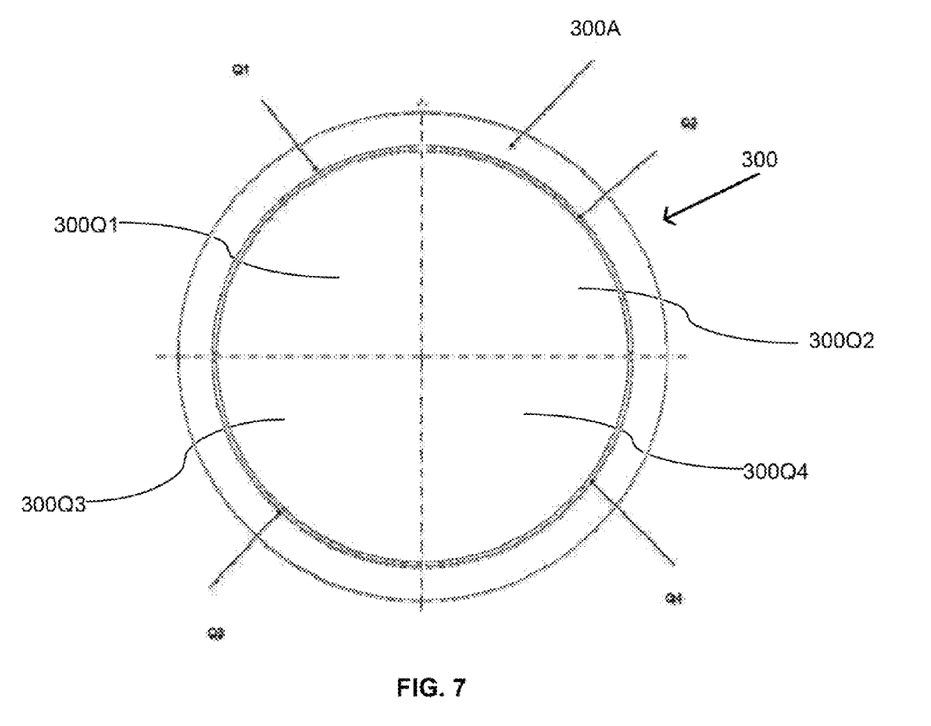
FIG. 7 schematically illustrates the dividing of a 360 degree antenna array into four quadrants which may be fabricated separately and then combined to provide a complete array.

From a mechanical design standpoint, component versatility, and cost perspective, it would be useful to break the antenna or into sections having desired angular configurations. For example, it may be desirable to break the antenna into 3, 4, 6, 8 or even more sections. FIG. 7 illustrates an example where the antenna 300 is divided into four quadrants 300Q1-300Q4 wherein each section includes its own sectional portion of an absorber ring 300A. The antenna could be processed flat and later rolled to the shape, i.e. to obtain desired radius of curvature. The quadrants could be integrated together to form a complete 360-degree array, or implemented separately (e.g, on the four corners of a ground vehicle). If implemented separately, the output data from each quadrant could be combined using Ethernet or some other high-data-rate communications protocol.

Figure 8:
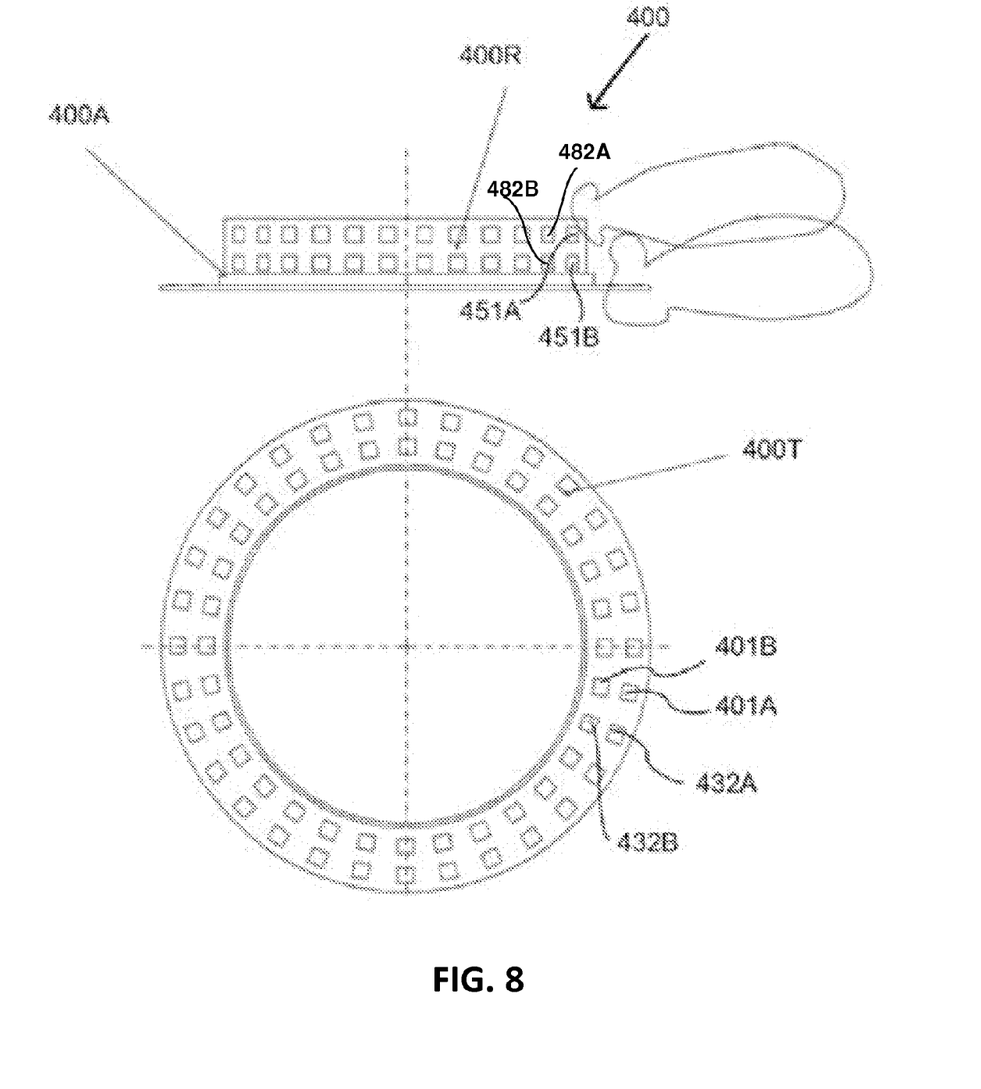
FIG. 8 schematically provides an exemplary antenna array according to a third embodiment of the invention wherein the transmit array is formed on a horizontal plane, 2 rows×N elements each (e.g., on a simple planar PCB), and the receive array is located on the surface of a cylindrical "wrap-around" substrate (2 rows×N elements each). The horizontal transmit array is designed to radiate predominantly in the horizontal plane by the Yagi effect.

A third embodiment for the antenna configuration is shown in FIG. 8 and would be useful when a low profile solution is desired. In this example half of the antenna 400 is printed on a horizontal PCB (i.e. the transmit array 400T in this example containing two rows each containing 32 elements 401A-432A and 401B-4326). Through proper electronic feeding, this produces an "endfire" radiation pattern in the horizontal plane (Yagi effect). The other half of antenna 400 is formed, as in the previous embodiments, as outward facing "broadside" radiating elements on a cylindrical surface (i.e. the receive array 400R in this example having 2×32 elements 451A-482A and 451B-482B, although not all 32 elements of each row appear in FIG. 8 because of the limited perspective view). FIG. 8 also shows the use of an absorber 400A. This embodiment can lower the antenna profile considerably and is attractive in mobile applications where the lower profile improves the aerodynamics and robustness with respect to mechanical damage.

Figure 9:
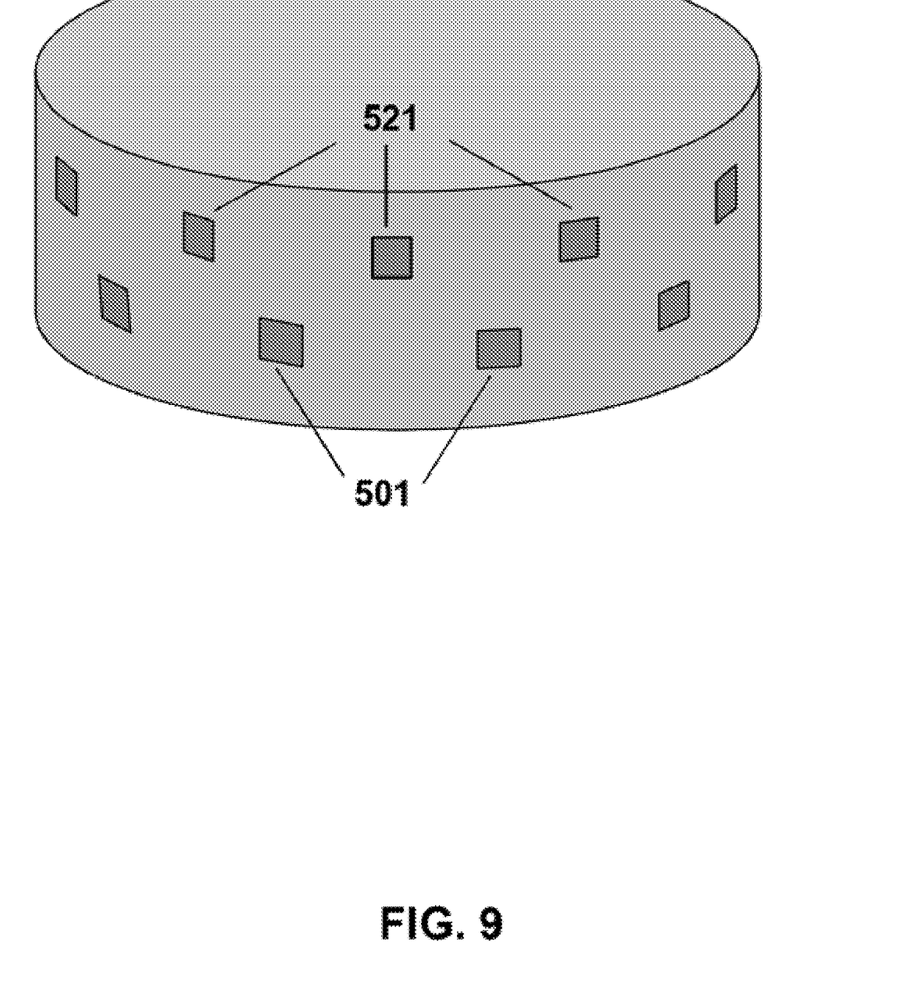
FIG. 9 schematically provides a fourth embodiment of the present invention which is a retrodirective antenna on a cylindrical surface with an azimuthal offset between the transmit elements and the receive elements.

A fourth embodiment of the invention is shown in FIG. 9 The issue of reducing radiative coupling between transmit and receive elements has already been addressed in the second and third embodiments. In FIG. 9, the elements are staggered in azimuth between the transmit row (501) shown on the bottom and the receive row (521) shown on the top. These could be interchanged. The staggering can reduce the radiative coupling significantly beyond the non-staggered configuration of FIGS. 1, 5, and 8, by reduction of non-radiative coupling through surface currents and substrate modes. The transmit and receive rows could be interchanged in this embodiment with little or no effect on performance.

Figure 10:
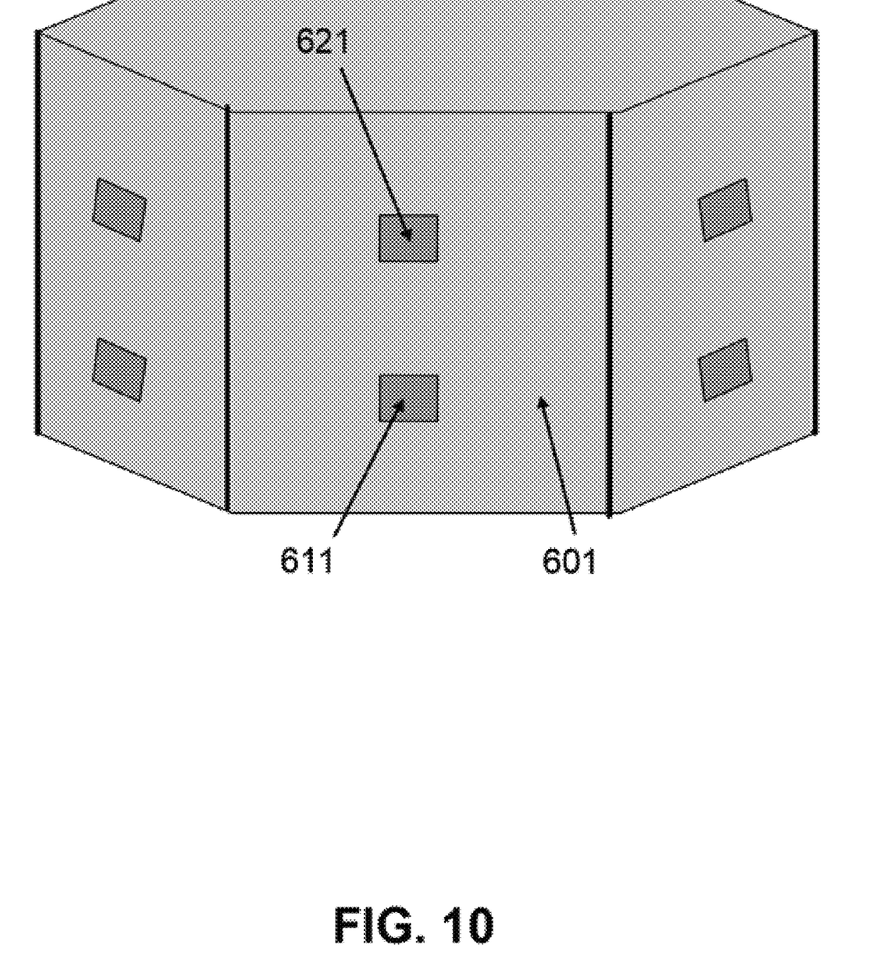
FIG. 10 schematically provides a fifth embodiment of the present invention which is a retrodirective antenna in a prismoidal configuration. The prismoidal configuration is similar to the cylindrical in that there is an axis of symmetry. But the antenna facets are fabricated as fiat "facets" instead of sections of a cylinder.

A fifth embodiment of the invention is shown in FIG. 10, which is a retrodirective antenna in a prismoidal configuration. The prismoidal configuration is similar to the cylindrical in that there is a vertical axis of symmetry. But the antenna is fabricated as individual flat "facets" (601) instead of a continuous cylinder, so the "wrap-around" technique is not necessary. Retrodirectivity is still possible provided that all corresponding transmit-receive pairs (611-621) lie on the same facet, and phase-conjugate processing is still implemented between them. The advantage of the prismoidal configuration is potential integration of the antennas with the electronics in each channel of a given transmit-receive pair. Being flat, the electronics could be packaged on the ground-plane side of the array facets after the antenna elements are defined by printed-circuit-board (PCB) methods. In contrast, the wrapping process results in curvilinear surfaces on which electronics cannot be easily packaged, thereby requiring separate PCBs to be fabricated for the electronics. The transmit and receive rows could be interchanged in this embodiment with little or no effect on performance.

Figure 11:
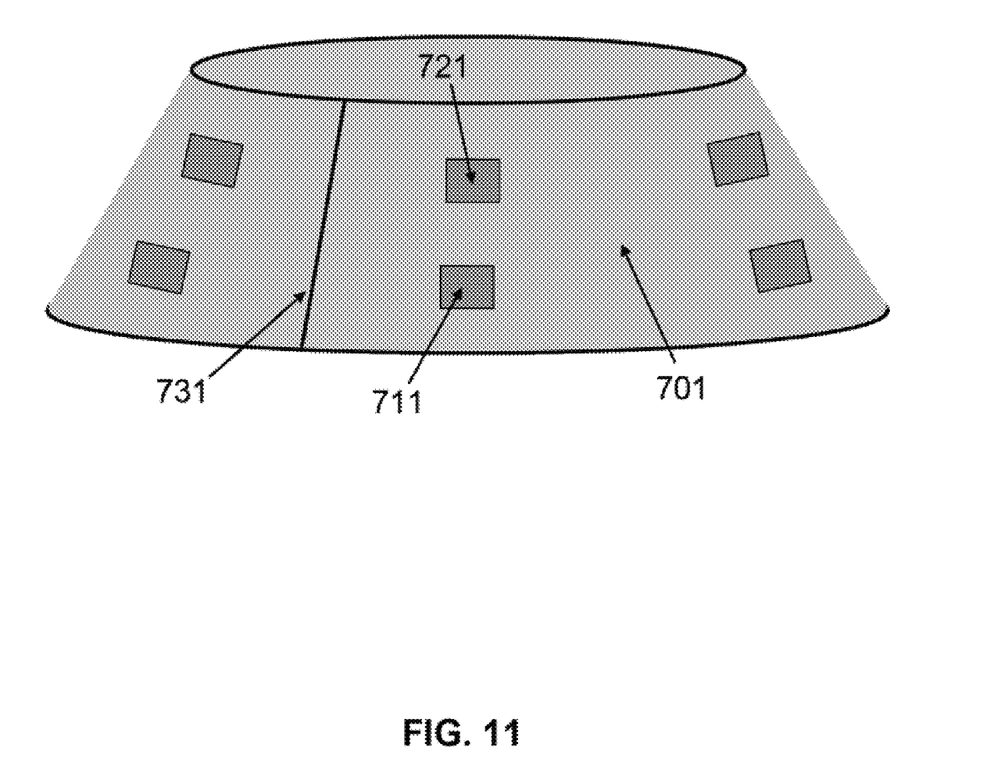
FIG. 11 schematically shows a sixth embodiment of the present invention which is a retrodirective antenna configured on a conical section. This is similar to the cylindrical configuration, but now the antenna pattern will point upwards above the horizontal plane.

A sixth embodiment of the invention is shown in FIG. 11 which is a retrodirective antenna configured on a conical section (701). This is similar to the cylindrical configuration, but now the antenna pattern will point upwards slightly above the horizontal plane. This will help reduce the deleterious effects of ground clutter and ground bounce between the transmit (711) and receive (721) elements, while still allowing the retrodirectivity by phase conjugation between corresponding transmit-receive pairs. The transmit and receive rows could be interchanged in this embodiment with little or no effect on performance. One issue with the conical-section wrap-around compared to the cylindrical wrap-around of FIGS. 1, 5, 8, and 9 is the fabrication procedure. In the cylindrical case, the starting PCB is in the form of a rectangle. In the conical wrap-around, the starting PCB is in the form of a quadrangle that must be carefully defined so that the two ends come together to form a contiguous seam (731) after the wrapping procedure.

Details of the six embodiments of the invention have been presented above along with a number of variations to those embodiments. In some further variations the receive and transmit arrays may take reversed positions. In other 2D embodiments where multiple rows of transmit elements and receive elements exist, these rows may be alternated instead of having them all grouped together. For example, the ordering could be transmit row 1, receive row 1, transmit row 2, receive row 2, etc. In still other embodiments, it is possible that antenna arrays be formed with redundant elements that may be used for calibration purposes or may only be used when a failure of a related element is detected. In other embodiments, failed channels may be detected and the system automatically to a smaller but still functional system with fewer radiating elements.

Additional teachings concerning retrodirective transmit-receive radio frequency systems are found in U.S. patent application Ser. No. 11/757,324, filed Jun. 1, 2007 which is entitled "Retrodirective Transmit-Receive Radio Frequency System Based on Pseudorandom Modulated Waveforms" and also in U.S. Provisional Application No. 60/922,482 filed Apr. 9, 2007. Each of these applications is hereby incorporated herein by reference as if set forth in full herein.

As noted above, embodiments of the invention may take a variety of forms some of which have been set forth herein in detail while others are described or summarized in a more cursory manner, while still others will be apparent to those of skill in the art upon review of the teachings herein though they are not explicitly set forth herein. Further embodiments may be formed from a combination of the various teachings explicitly set forth in the body of this application. Even further embodiments may be formed by combining the teachings set forth explicitly herein with teachings set forth in the various publications and patent applications referenced herein, each of which is incorporated herein by reference. In view of the teachings herein, many further embodiments, alternatives in design and uses of the instant invention will be apparent to those of skill in the art. As such, it is not intended that the invention be limited to the particular illustrative embodiments, alternatives, and uses described above but instead that it be solely limited by the claims presented hereafter.

We claim:

1. A retrodirective antenna comprising:
   (a) a transmit antenna array having at least one row of N transmit elements with each transmit element located in a first common plane at a common transmit radial distance from a center of the transmit antenna array, and each transmit element having a common spacing with its neighboring transmit elements over a defined angular transmit range, and each having a defined transmit azimuth position around the center of the transmit antenna array;
   (b) a receive antenna array having at least one row of N receive elements with each receive element located in a second common plane spaced from the first common plane, and each receive element having common receive radial distance from a center of the receive antenna array, wherein the center of the receive antenna is located along a line that extends through the center of the transmit antenna array and is perpendicular to the plane of the transmit antenna array, and wherein each of the N transmit elements have a corresponding receive element, and wherein each of the corresponding transmit and receive elements have azimuth positions selected from the group consisting of (1) matching azimuth positions and (2) azimuth positions that are offset by a fixed amount which is less than the difference in azimuth positions between neighboring transmit elements;
   (c) radio-frequency electronic components that join corresponding transmit and receive elements and drive each transmit element with a desired waveform such that retrodirectivity is provided between the received and transmitted radiation patterns,
   wherein either the "N" transmit elements or the "N" receive elements have "endfire" radiation patterns and are located on a horizontal plane while the other of the "N" receive elements or "N" transmit elements have "broadside" radiation patterns and are located on a surface of a cylinder, wherein the cylinder has an axis that is perpendicular to the plane.

2. The retrodirective antenna of claim 1 wherein the transmit array comprises "n" rows of "N" elements, and the receive array comprises "n" rows of "N" receive elements, wherein "n" is an integer greater than one and chosen from the group consisting of:
   (a) "n" is two, and
   (b) "n" is three, and
   (c) "n" is four 3. The retrodirective antenna of claim 2 wherein each element of the "n" x "N" array of transmit elements and each corresponding element of the "n" x "N" array of receive elements are connected to distinct electronic channels wherein the phase of received signals can be used to determine angular target elevation and/or target azimuth.

4. The retrodirective antenna of claim 2 wherein each of the "n" rows of transmit elements contain "N" transmit elements and wherein each of the "n" rows of receive elements contain "N" receive elements and wherein each of the N transmit elements in a given row has a common azimuth position with one of the transmit elements in each of the other "n" receive rows, and each of the N receive elements in a given row has a common azimuth position with one of the receive elements in each of the other "n" receive rows.

5. The retrodirective antenna of claim 4 wherein the common transmit azimuth positions are chosen from a group consisting of: (a) the same as the common receive azimuth positions, and (b) shifted by a specific number of degrees relative to the common receive azimuth positions.

6. The retrodirective antenna of claim 1 wherein corresponding transmit and receive elements are separated by an intervening electromagnetic absorber to reduce radiative cross-talk between the transmit and receive elements, or to reduce mutual coupling between transmit elements, or to reduce mutual coupling between the receive elements.

7. The retrodirective antenna of claim 1 wherein the transmit array comprises "n"×"N" transmit elements and "n"×"N" receive elements and wherein both the "n"×"N" transmit elements and the "n"×"N" receive elements are designed for use in direction- and range-finding radar systems.

8. The method of claim 1 wherein the defined angular transmit range is selected from the group consisting of :
   (a) at least 90 degrees of azimuth,
   (b) at least 180 degrees of azimuth,
   (c) at least 270 degrees of azimuth, and
   (d) substantially 360 degrees of azimuth.

9. The retrodirective antenna of claim 1 wherein the "N" transmit elements in each row have "endfire" radiation patterns and are located on the plane, while the "N" receive elements in each row have "broadside" radiation patterns and are located on the surface of the cylinder.

10. The retrodirective antenna of claim 1 wherein the "N" receive elements in each row have "endfire" radiation patterns and are located on the plane, while the "N" transmit elements in each row have "broadside" radiation patterns and are located on the surface of a cylinder.

\* \* \* \* \*